Feb. 13, 1968   R. E. NICHT   3,369,070
FUNCTION MODULATOR FOR SIMULATION APPARATUS
Filed Jan. 20, 1967   2 Sheets-Sheet 1
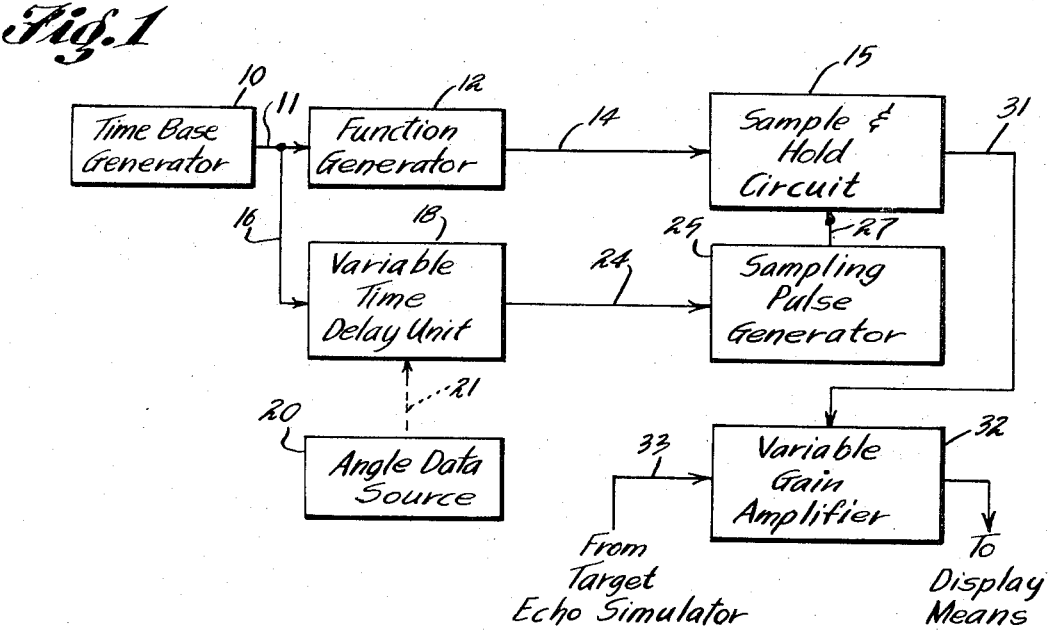
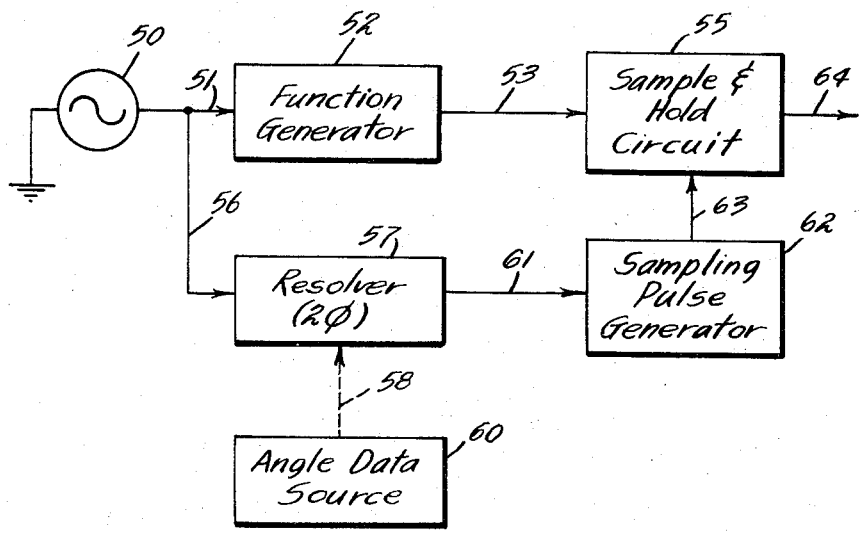
INVENTOR.
Roland E. Nicht

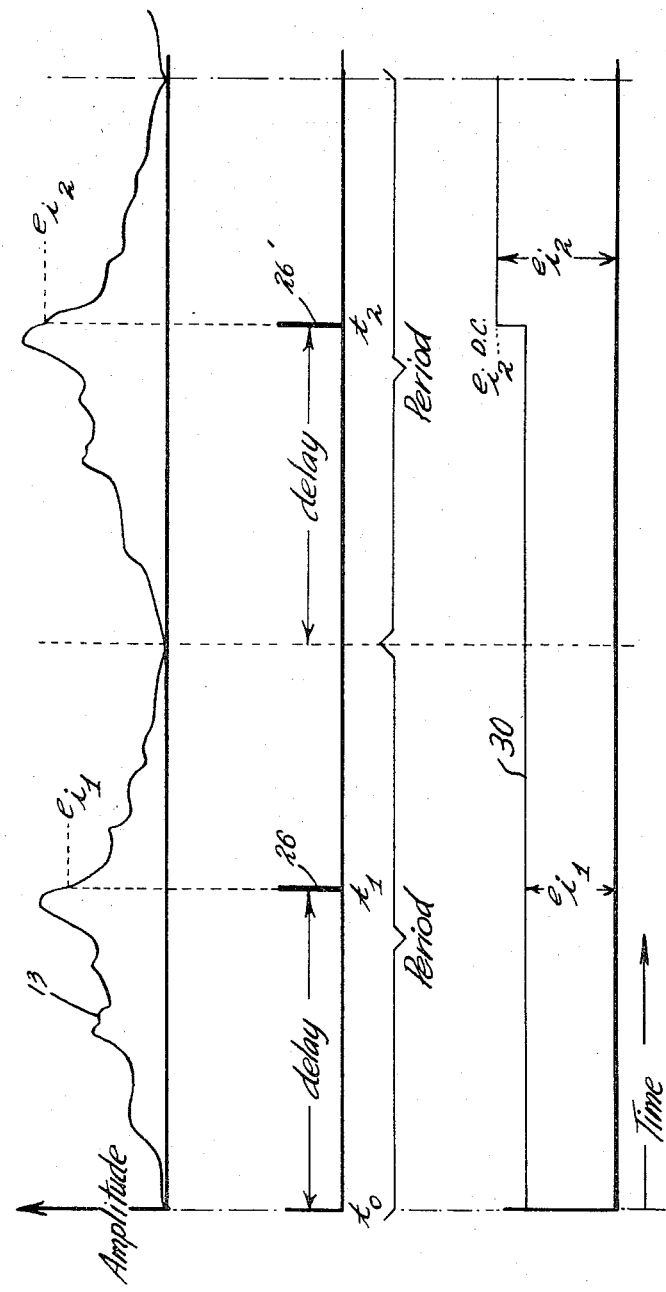

United States Patent Office 3,369,070
Patented Feb. 13, 1968

3,369,070
FUNCTION MODULATOR FOR SIMULATION APPARATUS
Roland E. Nicht, Cockeysville, Md., assignor, by mesne assignments, to the United States of America as represented by the Secretary of the Navy
Filed Jan. 20, 1967, Ser. No. 610,695
7 Claims. (Cl. 35—10.4)

ABSTRACT OF THE DISCLOSURE

Apparatus for simulating operational radar or sonar equipment for training purposes including means for increasing realism by generating a first electrical function representative of an operating condition, deriving ordinate amplitude information from the first electrical function to provide an output modulation function which is applied to a second electrical function.

Background of the invention

*Field of the invention.*—The invention is in the field of simulation apparatus for training personnel in the use of operational equipment such as radar, sonar, and the like. In such equipment it is desirable to provide as much realism as possible in the inclusion in the presentation or display of simulated target echoes, for example, of factors such as antenna side lobe effects, range attenuation, earth's curvature effects, and the like.

Description of the prior art

Simulators known heretofore have employed optical scanners, mechanically driven, to derive the electrical analog of special functions for direct application as modulation upon the desired function.

Summary of the invention

Briefly, the invention accomplishes the desired object, in a simulation apparatus, of deriving ordinate amplitude information from an electrical function, for example an electrical function representing the lobe effects of a beam of transmitted energy as in a radar or sonar system, through the provision of a time base generator, means operative in synchronism with the time base generator for generating the electrical function from which ordinate amplitude information is to be derived, means synchronized with the time base generator for repeatedly sampling the electrical function and for storing the sampled amplitude until the next sampling period, and means for providing an output corresponding to the amplitude of the sampled function at the time of the last sample. The output may then be utilized for modulating a simulated target echo signal to provide a realistic display.

With the foregoing in mind, it is one object of this invention to provide, in a simulation apparatus, an improved function modulator which is notably flexible in its adaptability to the various modulation applications in simulation apparatus.

It is another object of this invention to provide in a simulator apparatus an improved function modulator which, in one embodiment, repeatedly samples an electrical function which is generated in synchronism with a time base generator and is sampled in synchronism therewith.

Yet another object of the invention is the provision of another embodiment thereof wherein the function modulator repeatedly samples an electrical function which is generated to correspond to an electrical phase condition, the sampling being effected in response to a resolver or transolver output so as to produce a variable electrical phase proportional to shaft angle input at the resolver or transolver.

As another object the invention aims to provide in a simulator apparatus a function modulator of the foregoing character which can enable simulation of antenna beam patterns, electronic countermeasure signals or the like with virtually any desired degree of angular accuracy.

Other objects and advantages of the invention will become apparent from the following description thereof when read in conjunction with the accompanying sheet of drawings forming a part of this specification, and in which:

FIG. 1 is a functional block diagram of a function modulator embodying the present invention;

FIG. 2 is a graphic illustration of representative waveforms characteristic of operation of the function modulator of FIG. 1; and FIG. 3 is a functional block diagram of an alternative embodiment of the invention.

In the form of the invention illustrated in FIG. 1, there is provided a time base generator 10 which may be in any convenient well known form compatible with the simulator system in which the invention is to be embodied, and capable of providing periodic time reference signals, for example in the manner of a sweep voltage generator for a PPI cathode ray presentation. The time base generator 10 is connected by suitable conductor means, represented by line 11, to a function generator 12 which produces a periodic electrical function, the periods of which are controlled by the time reference signals from the time base generator 10 so as to be in synchronism therewith.

An example of an electrical function generated by function generator 12 is graphically illustrated in FIG. 2, wherein line 13 represents the voltage amplitude variations of the functions during successive time periods. It will be understood that the electrical function output of the function generator may be static, i.e., the function being the same for each period, or may vary progressively or otherwise from period to period. In the present example, the function represented by line 13 may be taken as representing the beam of radiated energy from a rotating radar antenna, the variations in amplitude being characteristic of side lobe effects. The function varies somewhat from one period to the next, the effect of which will be made evident as the description proceeds. The output of the function generator is connected by conductor means 14 to a sample and hold circuit 15, described later.

Connected also to the output of the time base generator 10 as by lines 11 and 16 is a variable time delay unit 18. This unit may be any one of a number of well known variable delay units which produce an output pulse after a predetermined time delay following in input signal. One example of such a delay unit is the mono-stable multivibrator having an RC coupling between the active elements, e.g., transistors, which may be varied by variable resistance or capacitance means to select the desired time delay.

In the present example the delay is selected in response to input to the variable time delay unit from an angle data source 20 via input means 21. The angle data source may be any means associated with the simulator system in which the invention is to be used which provides angle data, for example simulated target bearing. Thus, the input means 21 may be a shaft mechanically controlling a variable resistance to select the time delay imposed by unit 18, the position of the input means corresponding to the angular condition.

The output of the variable time delay unit 18 is in the form of signals conveyed by line 24 to a sampling pulse generator 25 which produces output pulses 26, 26' (FIG. 2) at times $t_1$, $t_2$, etc. determined by the time delay unit. The pulses 26 are conveyed via line 27 to the sample and hold circuit 15 as a control input thereto.

The sampling pulse genertaor 25 may comprise one of the well known forms of monostable or one-shot multivibrators which produce one output pulse 26 for each input or trigger pulse, the output pulses being of a predetermined width which can readily be determined by selection of circuit values.

The sample and hold circuit 15 receives via line 14 as one input the varying amplitude signal 13 of the function generator 12. When, as at time $t_1$, a pulse 26 is received as a second input via line 27, the sample and hold circuit 15 "reads" the amplitude $e_{i_1}$ of the function 13 and produces a corresponding or proportional output signal 30 on line 31. The output signal 30 is maintained at voltage $e_{i_1}$ until at time $t_2$ a second pulse 26′ triggers the sample and hold circuit 15 to take a new sample or reading of the amplitude of signal 13 and to produce a corresponding voltage $e_{i_2}$ in signal 30. Thus, at the end of each time period, a sampling pulse 26 causes the sample and hold circuit to update its output signal 30. Usually the level of the signal 30 will be that of amplitude of signal 13 at the termination of the sampling pulses 26, 26′, etc. By making the pulses 26, 26′, etc. more narrow, the angular resolution of the device is increased.

The output line 31 is connected to apply the signal 30 as a modulation function input means such as a variable gain amplifier 32 which, in the present example receives on line 33 simulated target echo signals from simulated target echo generator means not forming part of the invention. The variable gain amplifier amplifies the target signals in accordance with the amplitude of signal 30, thereby impressing on the target echo signals the effects of the antenna beam pattern, and passes the so modulated target echo signals to utilization means (not shown) such as a PPI cathode ray tube display.

An alternative embodiment is illustrated in FIG. 3 wherein the reference base is phase rather than time. Thus, a source 50 of alternating current potential is connected by line 51 to a function generator 52 which provides as an output on line 53 an electrical function representative, for example of range attenuation, or the like. The output line 53 is connected to a sample and hold circuit 55.

Connected also to the output of the generator 50 by lines 51 and 56 is a variable resolver 57 which may be varied to produce a selected phase shift as by positioning of input shaft means 58 from an angle data source 60. The shifted phase output of the resolver means 57 is conducted by line 61 to a sampling pulse generator 62 which produces in response thereto sampling pulses which are conveyed by line 63 to the sample and hold circuit 55 for triggering thereof.

The latter produces an output modulation function on line 64 which can be applied in any suitable manner to simulated target echo pulses to provide, in the present example, realistic range attenuation characteristics.

The resolver means 57 may, of course, be in the form of a transolver in the event the embodiment of FIG. 3 is based on three-phase output of the generator 50.

Obviously many modifications and variations of the present invention are possible in the light of the above teachings. It is therefore to be understood that within the scope of the appended claims the invention may be practiced otherwise than as specifically described.

What is claimed is:
1. In simulation apparatus of the character described including means for providing a first electrical function representative of a simulated operational characteristic, the improvement of a function modulator for modulating said first electrical function in accordance with a second electrical function, said function modulator comprising:
  synchronizing signal generator means for providing synchronizing signals;
  an electrical function generator connected to the output of said synchronizing signal generator and operative to generate said second electrical function as a waveform synchronized with said synchronizing signals;
  a sample and hold circuit connected to the output of said electrical function generator;
  a source of angle data;
  variable means connected to the output of said synchronizing signal generator and connected to said source of angle data, said variable means being responsive to said angle data to provide an output of altered synchronizing signals;
  a sampling pulse generator connected to said variable means and responsive to said altered synchronizing signals to provide an output of sampling pulses for actuating said sample and hold circuit;
  said sample and hold circuit being responsive to said sampling pulses to sample a coordinate of said waveform and to produce a modulation signal which is updated in response to each of said sampling pulses to correspond to the sampled coordinate of said waveform at a time during each of said sampling pulses; and
  means for applying said modulation signal to said first electrical function.

2. Apparatus as defined in claim 1 and wherein:
  said synchronizing signal generator comprises a time base generator; and
  said variable means comprises a time delay unit.

3. Apparatus as defined in claim 2 and wherein:
  said first electrical function comprises simulated target echo signals.

4. Apparatus as defined in claim 2 and wherein:
  said means for applying said modulation signal to said waveform comprises variable gain amplifier means for amplifying said waveform in accordance with said modulation signal.

5. Apparatus as defined in claim 1 and wherein:
  said synchronizing signal generator comprises a source of alternating current; and
  said variable means comprises resolver means.

6. Apparatus as defined in claim 5 and wherein:
  said synchronizing signal generator comprises a source of three phase alternating current; and
  said resolver means comprises a transolver.

7. Apparatus as defined in claim 5 and wherein:
  said first electrical function comprises target signal echoes.

No references cited.

RODNEY D. BENNETT, *Primary Examiner.*

T. H. TUBBESING, *Assistant Examiner,*